United States Patent
Ghanwani et al.

(10) Patent No.: US 10,862,813 B2
(45) Date of Patent: Dec. 8, 2020

(54) MICROBURST VISIBILITY SYSTEM

(71) Applicant: Dell Products L.P., Round Rock, TX (US)

(72) Inventors: Anoop Ghanwani, Roseville, CA (US); Raja Sathianarayan Jayakumar, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 16/172,521

(22) Filed: Oct. 26, 2018

(65) Prior Publication Data

US 2020/0136983 A1    Apr. 30, 2020

(51) Int. Cl.
*H04L 12/835* (2013.01)
*H04L 12/801* (2013.01)
*H04L 12/26* (2006.01)
*H04L 12/851* (2013.01)

(52) U.S. Cl.
CPC .............. *H04L 47/30* (2013.01); *H04L 43/04* (2013.01); *H04L 47/11* (2013.01); *H04L 47/2483* (2013.01)

(58) Field of Classification Search
CPC ......... H04L 47/30; H04L 43/04; H04L 47/11; H04L 47/2483
See application file for complete search history.

(56) References Cited

U.S. PATENT DOCUMENTS

| | | | | |
|---|---|---|---|---|
| 9,042,230 B2* | 5/2015 | Edsall | ...................... | H04L 43/16 370/235 |
| 2014/0269379 A1* | 9/2014 | Holbrook | ............. | H04L 43/0882 370/252 |
| 2015/0249611 A1* | 9/2015 | Uozumi | ................... | H04L 47/30 370/230 |
| 2017/0012851 A1* | 1/2017 | Teeter | ..................... | H04L 43/16 |
| 2017/0118108 A1* | 4/2017 | Avci | ......................... | H04L 45/36 |
| 2018/0034718 A1* | 2/2018 | Subramani | .............. | H04L 43/04 |
| 2018/0063007 A1* | 3/2018 | Johnson | .................. | H04L 49/50 |
| 2018/0145906 A1* | 5/2018 | Yadav | ...................... | H04L 45/70 |
| 2019/0042110 A1* | 2/2019 | Bharadwaj | ............ | G06F 3/0665 |
| 2019/0280982 A1* | 9/2019 | Shiraki | ................... | H04L 47/11 |
| 2019/0334792 A1* | 10/2019 | Ayandeh | .............. | H04L 43/0876 |
| 2019/0342217 A1* | 11/2019 | Mazurek | ................. | H04L 47/25 |

* cited by examiner

*Primary Examiner* — Michael J Moore, Jr.
(74) *Attorney, Agent, or Firm* — Haynes and Boone, LLP

(57) ABSTRACT

A microburst visibility system includes a switch device coupled to each sender device(s) and receiver device(s). The switch device receives flows transmitted by the sender device(s) to the receiver device(s). For each flow that include data packets that are stored in a first queue, the switch device provides a first queue identifier for the first queue in a flow record associated with that flow and modifies, for each data packet that is transmitted as part of that flow, flow information in data packet counter(s) that are associated with the first queue identifier in the flow record associated with that flow. When the switch device detects a microburst in the first queue, it captures the flow information in each data packet counter that is associated with the first queue identifier in each of the flow records included in the switch device, and provides it for analysis.

20 Claims, 12 Drawing Sheets

MICROBURST VISIBILITY SYSTEM

BACKGROUND

The present disclosure relates generally to information handling systems, and more particularly to providing visibility of microbursts occurring in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, router devices, and/or other networking devices known in the art, are sometimes subject to microbursts. Microburst behavior generally occurs in fast-packet switched networks when rapid bursts of data packets are sent in quick succession, leading to periods of full line rate transmission that can fill up queues or packet buffers in the network device, both in network endpoints as well as router devices and switch devices in the network. For example, in a network in which flows are sent from one or more sender devices to one or more receiver devices, microbursts can result in a short, intense build up (typically on the order of microseconds or milliseconds) of data packets in queue(s) associated with a port on a switch device. Conventionally, such microburst behavior is detected by measuring the rate of data packet build up in those queues, which is typically accomplished by polling queue depth at a high frequency or setting triggers, and/or including hardware in the switch device that allows the setting of a trigger based on a rate of data packet build up in the queue, an amount of data packet build up in the queue, and/or other microburst triggering characteristics that would be apparent to one of skill in the art in possession of the present disclosure. Providing conventional microburst visibility raises a number of issues.

For example, In-band Network Telemetry (INT) methods In-Situ Operations, Administration, and Maintenance (IOAM) methods, and Data Path Probe (DPP) methods allow for various parameters to be associated with a flow such as, for example, a timestamp parameter and a queue length parameter, which allows those parameters to be utilized in retrieving that information about that flow. However, to apply such conventional methods to provide microburst visibility, they need to be enabled on all flows in the network, and such conventional methods are relatively burdensome with regard to network bandwidth (i.e., the additional information carried by the data packets in the flow utilize increased bandwidth), as well as with regard to offline processing of that information to provide visibility into a microburst (which is true even when only select flows are processed, much less if such conventional methods are enabled on all the flows in the network). Other conventional methods provide for the copying of all the packets in a queue to memory when a microburst is detected so that those packets can later be analyzed, which provides relatively good visibility of the microburst, but is intensive with regard to storage and processing, as the size of the packets in a queue during a microburst can reach gigabyte levels, and those packets must be analyzed offline to determine which flows are affected. Furthermore, conventional microburst visibility techniques detect when a microburst has occurred, but do not provide a variety of information that could be useful in analyzing the microburst, including which flows contributed to that microburst, which flows were affected by that microburst, and other information that could be helpful in analyzing a microburst.

Accordingly, it would be desirable to provide an improved microburst visibility system.

SUMMARY

According to one embodiment, an Information Handling System (IHS) includes a storage system including a flow database; a processing system that is coupled to the storage system; and a memory system that is coupled to the processing system and that includes instructions that, when executed by the processing system, cause the processing system to provide a flow engine that is configured to: receive a plurality of flows transmitted by at least one sender device to at least one receiver device and, for each the plurality of flows that include data packets that are stored in a first queue: provide a first queue identifier for the first queue in a flow record associated with that flow in the flow database; and modify, for each data packet that is transmitted as part of that flow, first queue flow information in at least one data packet counter that is associated with the first queue identifier in the flow record associated with that flow in the flow database; detect a microburst associated with the first queue; capture the first queue flow information in each data packet counter that is associated with the first queue identifier in each of the flow records included in the flow database; and provide the first queue flow information that was captured for analysis.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
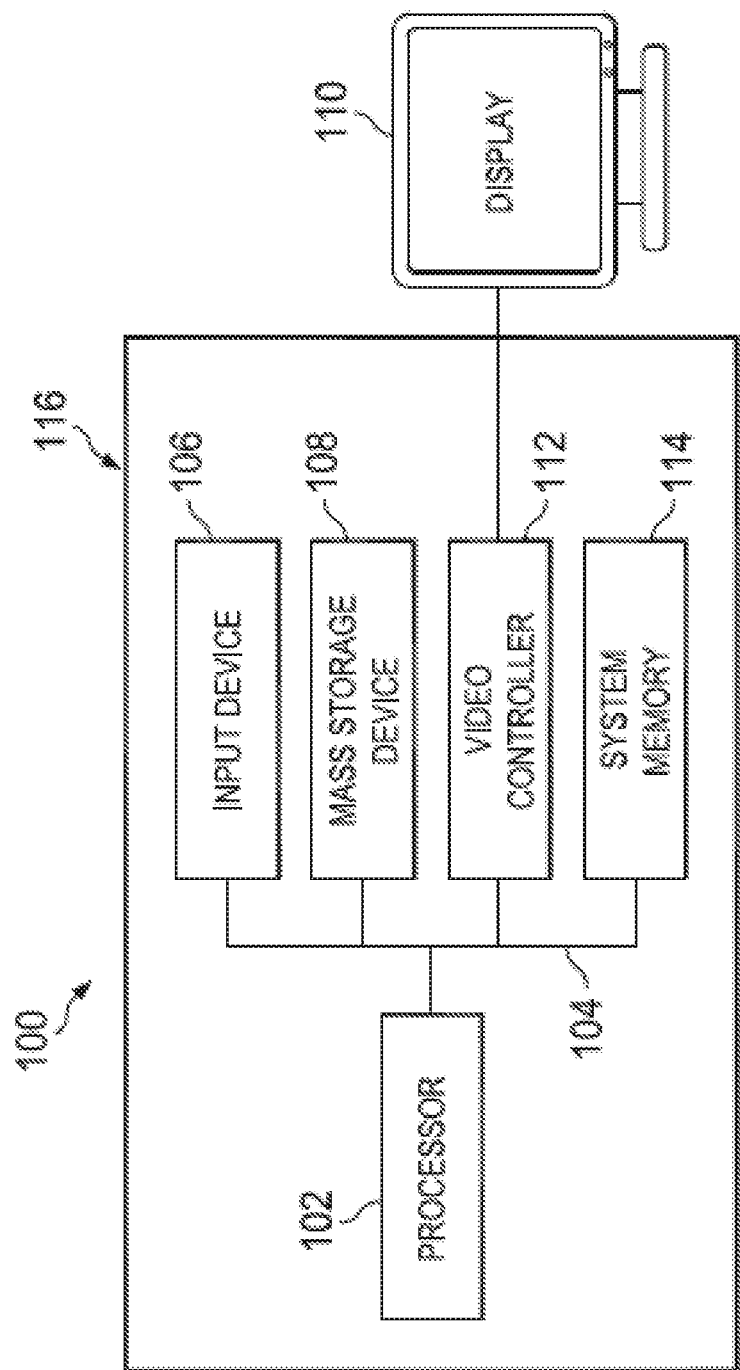
FIG. 1 is a schematic view illustrating an embodiment of an Information Handling System.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
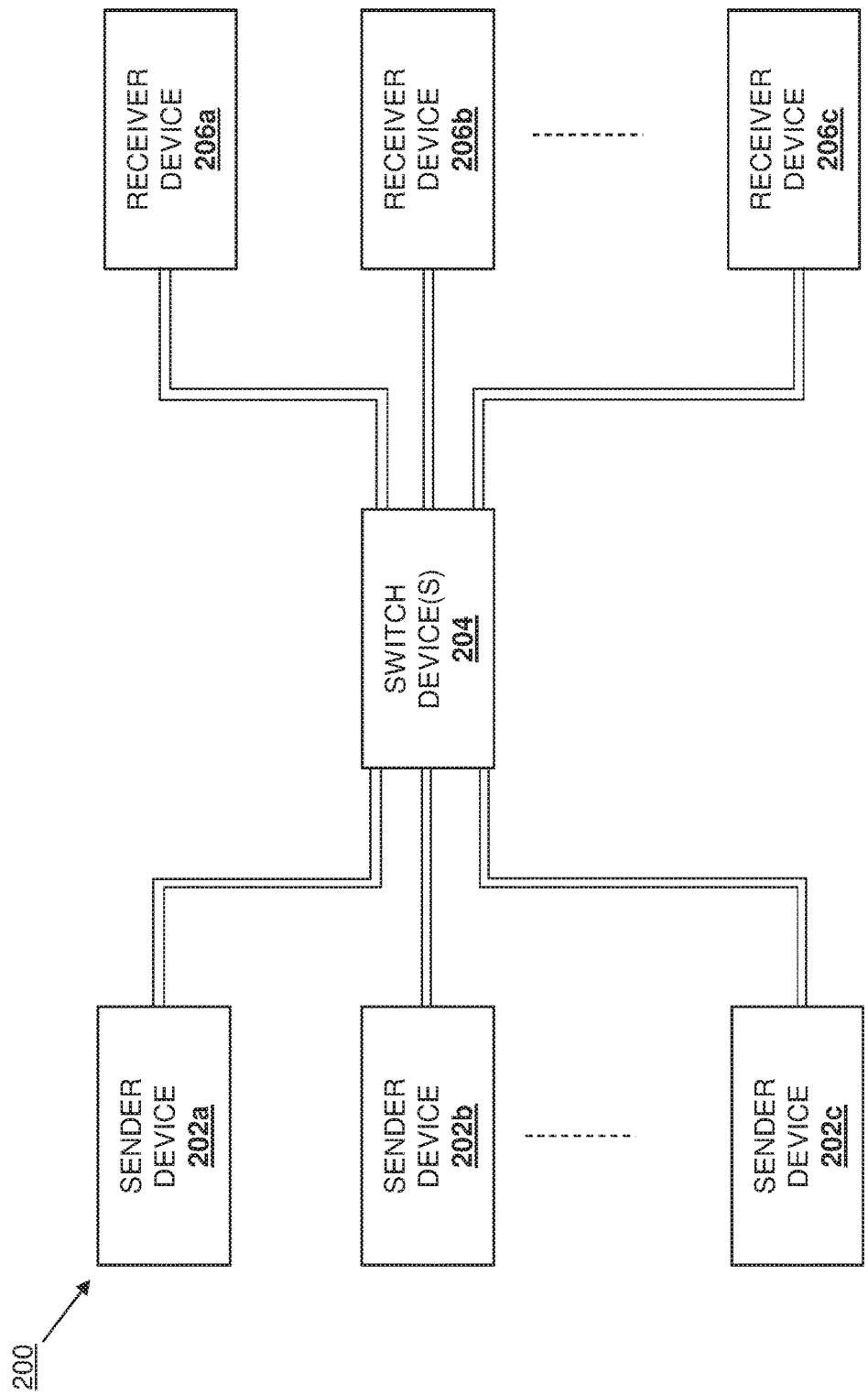
FIG. 2 is a schematic view illustrating an embodiment of a network of sender devices and receiver devices connected via switch devices.

Referring now to FIG. 2, an embodiment of a network 200 that utilizes the microburst visibility system of the present disclosure is illustrated. In the illustrated embodiment, the network 200 includes a plurality sender devices 202a, 202b, and up to 202c. Any or all of the sender devices 202a-c may be provided by the IHS 100 discussed above with reference to FIG. 1, and/or may include some or all of the components of the IHS 100. In the examples discussed below, any or all of the sender devices 202a-c may be provided by server devices and/or any other computing device that are configured to generate and transmit one or more flows through the network 200. A plurality of switch devices 204 are coupled to each of the sender devices 202a-c, any or all of which may be provided by the IHS 100, and/or may include some or all of the components of the IHS 100. While illustrated and described as switch devices, one of skill in the art in possession of the present disclosure will recognize that any of the switch devices 204 may be provided by router devices and/or other networking devices known in the art. A plurality of receiver devices 206a, 206b, and up to 206c are coupled to the switch devices 204. Any or all of the receiver devices 206a-c may be provided by the IHS 100 discussed above with reference to FIG. 1, and/or may include some or all of the components of the IHS 100. In the examples discussed below, any or all of the receiver devices 202a-c may be provided by any computing device that is configured to receive one or more flows transmitted through the network 200. While a specific network 200 is utilized in the examples below to describe the microburst visibility system of the present disclosure, one of skill in the art in possession of the present disclosure will recognize that networks may benefit from the teachings of the present disclosure while including any of a variety of components and/or component configurations that will fall within the scope of the present disclosure as well.

Figure 3:
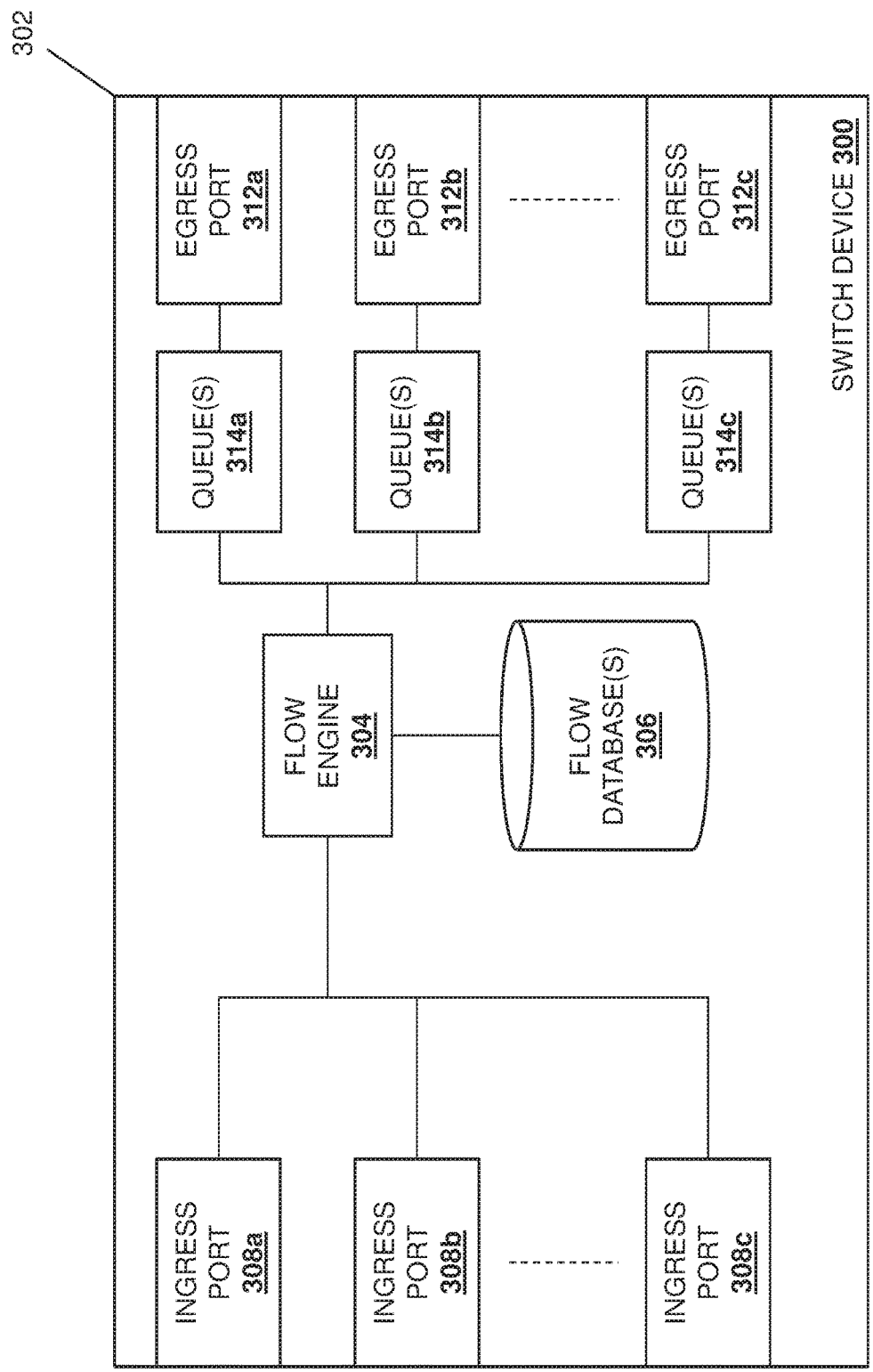
FIG. 3 is a schematic view of a microburst visibility system provided in a switch device including in the network of FIG. 2.

Referring now to FIG. 3, an embodiment of a switch device 300 is illustrated that may provide any or all of the switch devices 204 discussed above with reference to FIG. 2. As such, the switch device 300 may be provided by the IHS 100 discussed above with reference to FIG. 1, and/or may include some or all of the components of the IHS 100, and in specific examples may also provide router devices and/or other networking devices known in the art. In the illustrated embodiment, the switch device 300 includes a chassis 302 that houses the components of the switch device 300, only some of which are illustrated in FIG. 3. For example, the chassis 302 may house a processing system (not illustrated, but which may include the processor 102 discussed above with reference to FIG. 1, a Network Processing Unit (NPU) provided by a single chip or multiple chips, and/or other processing systems known in the art) and a memory system (not illustrated, but which may include the memory 114 discussed above with reference to FIG. 1) that is coupled to the processing system and that includes instructions that, when executed by the processing system, cause the processing system to provide a flow engine 304 that is configured to perform the functions of the flow engines and switch devices discussed below.

The chassis 302 may also house a storage system (not illustrated, but which may include the storage device 108 discussed above with reference to FIG. 1) that is coupled to the flow engine 304 (e.g., via a coupling between the storage system and the processing system), and that includes one or more flow databases 306 that are configured to store any of the information utilized by the flow engine 304 and/or the switch device 300 as discussed below. The chassis 302 also includes a plurality of ingress ports 308a, 308b, and up to 308c, each of which may be accessible on a surface of the chassis 302, and each of which may be coupled to the flow engine 304 (e.g., via a coupling between the ingress ports 308a-c and the processing system). Similarly, the chassis 302 also includes a plurality of egress ports 312a, 312b, and up to 312c, each of which may be accessible on a surface of the chassis 302, and each of which configured to utilize one or more queues, such as the queue(s) 314a utilized by the egress port 312a, the queue(s) 314b utilized by the port 312b, and the queue(s) 314c utilized by the port(s) 312c. As illustrated, the flow engine 304 may be coupled to each of the egress ports 312a-c (e.g., via a coupling between the egress ports 312a-c and the processing system) As would be understood by one of skill in the art in possession of the present disclosure, queue(s) may be utilized by a port to store data packets processed by the flow engine 304 prior to transmitting those data packets through the network (e.g., as in the case of the queue(s) 314a-c utilized by the egress ports 312a-c, respectively.)

In some examples, any or all of the ports on the switch device 300 may utilize a plurality of queues (e.g., eight queues per port in some examples) that are configured allow for prioritization of packets for those ports via different priority queues. For example, data packets ingressing the switch device 300 may include priority information that is utilized by the flow engine 304 to determine which of a plurality of prioritized queues associated with an egress port should be used to store those data packets. However, while a specific switch device has been illustrated and described, one of skill in the art in possession of the present disclosure will recognize that switch devices, router devices, and/or other networking devices may include a variety of components and/or component configurations that will fall within the scope of the present disclosure as well. For example, while one of skill in the art in possession of the present disclosure will recognize that the switch device 300 is an output queued switch devices, the teaching of the present disclosure may be extended to switch devices with other queue architectures such as, for example, input/output queued switch devices (e.g., where each of the ingress ports 308a-c utilize respective queue(s) similar to the queues 314a-c), Virtual output Queueing (VoQ) switch devices, and/or other switch devices known in the art.

Figure 4:
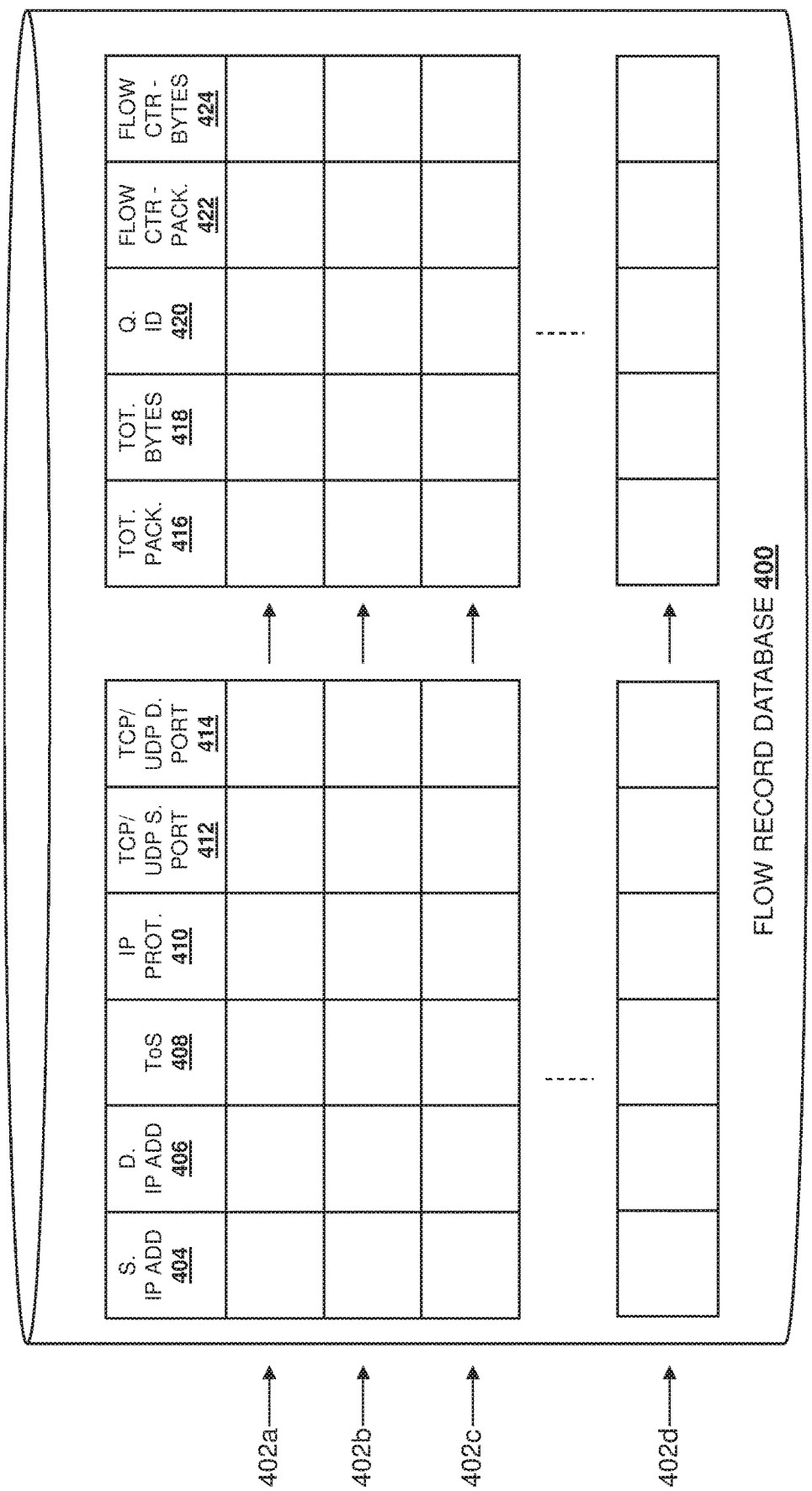
FIG. 4 is a schematic view illustrating an embodiment of a flow record database that may be included in the switch device of FIG. 3.

Referring now to FIG. 4, an embodiment of a flow record database 400 is illustrated that may be stored as one of the flow databases 306 in the storage system of FIG. 3. In the illustrated embodiment, the flow record database 400 includes a plurality of flow record entries 402a, 402b, 402c, and up to 402d which, as discussed in more detail below, may each store a flow record including flow information about a flow being transmitted by the switch device 300 of FIG. 3. In the illustrated embodiment, each flow record entry 402a-d includes flow identification information such as a source Internet Protocol (IP) address 404, a destination IP address 406, a Type of Service (ToS) 408, an IP protocol 410, a Transmission Control Protocol/User Datagram Protocol (TCP/UDP) source port 412, and a TCP/UDP destination port 414. As will be appreciated by one of skill in the art, the flow identification information in a flow record for a particular flow in one of the flow record entries 402a-d may be included in every data packet that is part of that flow. However, while particular flow identification information is illustrated and described in FIG. 4, one of skill in the art in possession of the present disclosure will recognize that a variety of flow identification information other than that illustrated in FIG. 4 may be utilized to identify any particular flow while remaining within the scope of the present disclosure.

In addition, each flow record entry 402a-d includes flow tracking information such as a total packets handled column 416 and a total bytes handled column 418. As will be appreciated by one of skill in the art, the flow tracking information in a flow record for a particular flow in one of the flow record entries 402a-d allows the total number of packets and bytes that have been handled by the switch device 300 as part of a flow to be tracked. However, while particular flow tracking information is illustrated and described in FIG. 4, one of skill in the art in possession of the present disclosure will recognize that a variety of flow tracking information other than that illustrated in FIG. 4 may be utilized to track any particular flow while remaining within the scope of the present disclosure. Furthermore, each flow record entry 402a-d includes queue flow information such as the queue identifier 420, a queue data packet number counter 422, and a queue data packet byte counter 424. As discussed below, the queue flow information in a flow record for a particular flow in one of the flow record entries 402a-d includes information about a queue being utilized by the flow, and as discussed above may be captured in response to detecting a microburst event in order to allow for analysis of the microburst event. However, while particular queue flow information is illustrated and described in FIG. 4, one of skill in the art in possession of the present disclosure will recognize that a variety of queue flow information other than that illustrated in FIG. 4 may be utilized to analyze microbursts while remaining within the scope of the present disclosure, just a few examples of which are provided below.

Figure 5:
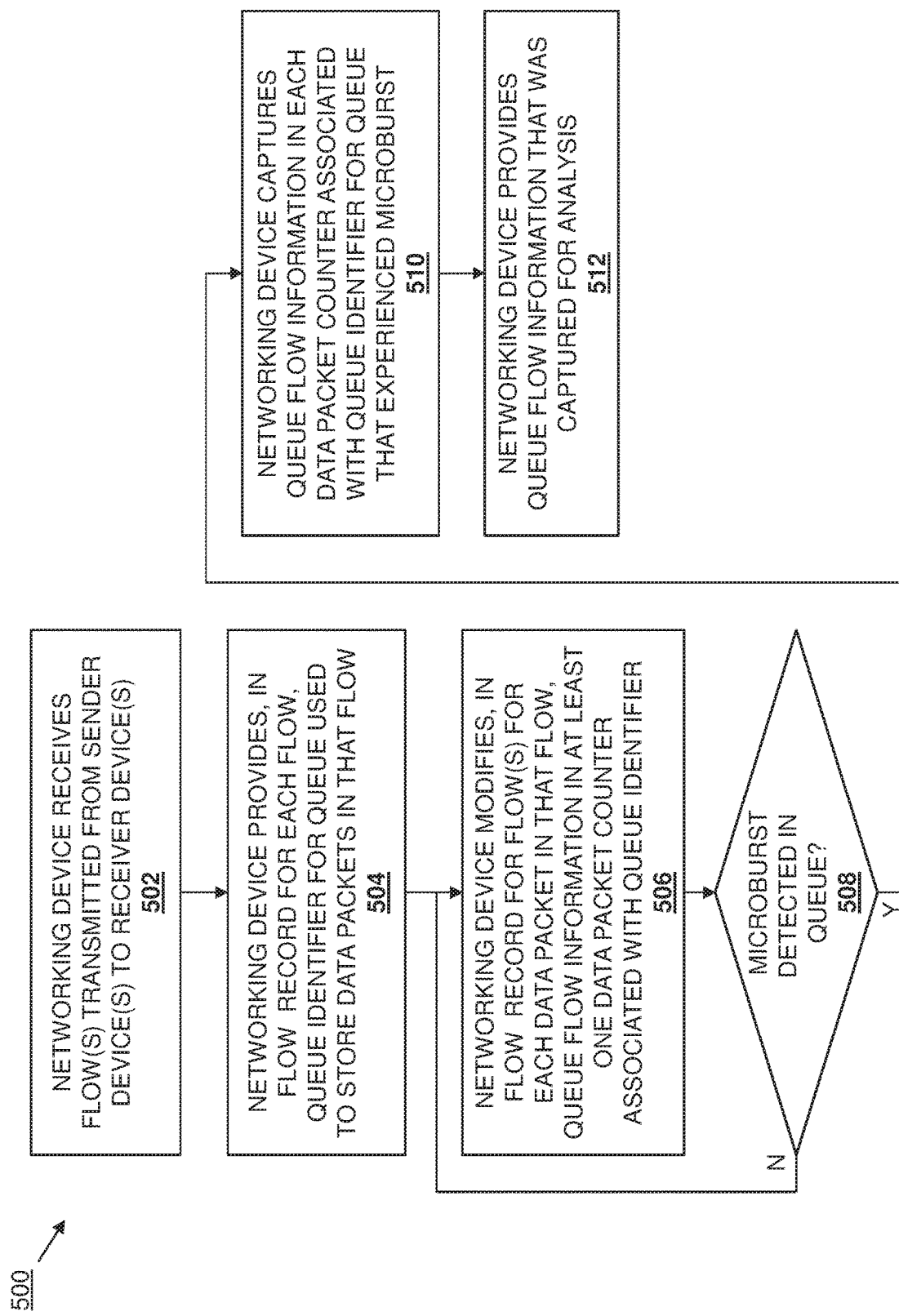
FIG. 5 is a flow chart illustrating an embodiment of a method for providing microburst visibility.

Referring now to FIG. 5, an embodiment of a method 500 for providing microburst visibility is illustrated. As discussed below, the systems and methods of the present disclosure utilize flow records to track the flows utilizing any particular queue, and capture queue flow information in those flow records in the event of a microburst event in a queue, which allows for the analysis of that queue flow information to determine the flow(s) that contributed to that microburst, the flows that were affected by that microburst, and/or other microburst visibility information that would be apparent to one of skill in the art in possession of the present disclosure. For example, the systems and methods of the present disclosure may provide a networking device with a flow records database having flow records that, in addition to storing flow identification information and flow tracking information for each flow handled by that networking device, also store queue flow information that provides for the identification of the queue used by data packets in each flow, as well as the number of data packets and data packet bytes in that queue for each flow at any particular time. As such, upon the detection of a microburst event in a queue, the queue flow information may be captured and provided for analysis to determine which flows had data packets in that queue at the time of the microburst, the number data packets belonging to each flow that were in that queue at the time of the microburst, the number of data packet bytes belonging to each flow that were in that queue at the time of the microburst, and/or other information that provides visibility into the causes and effects of the microburst. Such flow records enhanced with queue flow tracking information provides visibility into queues during microburst events with relatively little processing (or other) overhead compared to conventional microburst visibility systems, and allows microburst visibility reports to be generated that can be viewed locally without the need for a microburst information collection system.

The method 500 begins at block 502 where a networking device receives a flow(s) transmitted from sender device(s) to receiver device(s). In an embodiment, at block 502, any or all of the sender devices 202a-c may generate and transmit data packet flows via any or all of the switch devices 204 to any or all of the receiver devices 206a-c in the network 200. As would be understood by one of skill in the art in possession of the present disclosure, sender devices (e.g., server devices) may generate and transmit data packets as part of a flow through a network for consumption by receiver devices (e.g., server devices, desktop computing devices, laptop/notebook computing devices, tablet computing devices, mobile phones, etc.) A few examples of flows include database updates sent between servers, streaming video sent by a server device through a network to one or more receiver devices, real-time audio or video (e.g., audio or video calls) sent from a sender device to one or more receiver devices, and/or a variety of flows that would be apparent to one of skill in the art in possession of the present disclosure. Such flows are handled by one or more networking devices (e.g., one or more of the switch devices 204) to route those flows through the network 200 to any of the receiver devices 206a-c.

In any particular switch device (e.g., the switch device 300) operating to help route the flows from the sender devices 202a-c to the receiver devices 206a-c, data packets in those flows may be received at the ingress ports 308a-c, processed by the flow engine 304, queued in the queues 314a-c, and transmitted via the egress ports 312a-c. Furthermore, one of skill in the art in possession of the present disclosure will recognize that data packets in any particular flow will tend to ingress the switch device 300 on the same ingress port and egress the switch device 300 on the same egress port, and thus will utilize the same queue(s) for that ingress port and egress port. In the examples provided below, a first flow handled by the switch device 300 may have each of its data packets ingress the switch device 300 via the ingress port 308b, processed by the flow engine 304, stored in the queue(s) 314a, and egress the switch device 300 via the egress port 312a; while a second flow handled by the switch device 300 may have each of its data packets ingress the switch device 300 via the ingress port 308c, processed by the flow engine 304, stored in the queue(s) 314a, and egress the switch device 300 via the egress port 312a; and a third flow handled by the switch device 300 may have each of its data packets ingress the switch device 300 via the ingress port 308a, processed by the flow engine 304, stored in the queue(s) 314a, and egress the switch device 300 via the egress port 312a. However, while the examples below focus on a microburst event occurring in one of the queue(s) 314a, one of skill in the art in possession of the present disclosure will recognize that visibility into microburst events occurring in multiple queues may be provided via the teachings of the present disclosure, and one of skill in the art will also recognize that microburst events occurring in any of the queues in the switch device 300 may be detected and handled in substantially the same manner as discussed below while remaining within the scope of the present disclosure as well.

Figure 6:
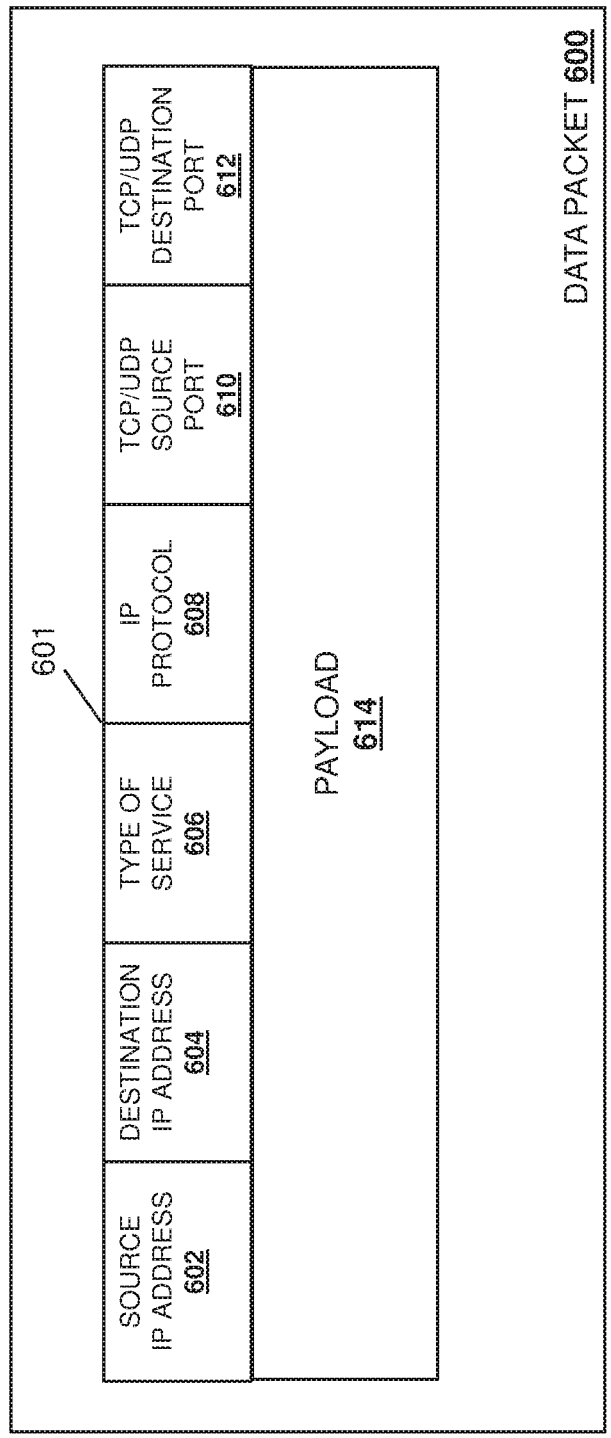
FIG. 6 is a schematic view illustrating an embodiment of a data packet that may be transmitted as part of a flow from a sender device to a receiver device in the network of FIG. 2.

Referring to FIG. 6, an embodiment of a data packet 600 is illustrated that may be any data packet that is part of any of the flows received by the networking device at block 502. In the illustrated embodiment, the data packet 600 includes flow identification information (e.g., in a header 601 of the data packet 600 illustrated in FIG. 6) such as, for example, the source IP address 602, the destination IP address 604, the type of service 606, the IP protocol 608, the TCP/UDP source port 610, and the TCP/UDP destination port 612. Furthermore, the data packet 600 includes a payload 614 as well. One of skill in the art in possession of the present disclosure will recognize that the data packet 600 illustrated in FIG. 6 provides an example of an n-tuple of flow identification information that may be used to transmit data packets in a flow, as well identify any data packets transmitted according to that n-tuple as part of that flow, and other flow identification information will fall within the scope of the present disclosure as well.

Figure 7A:
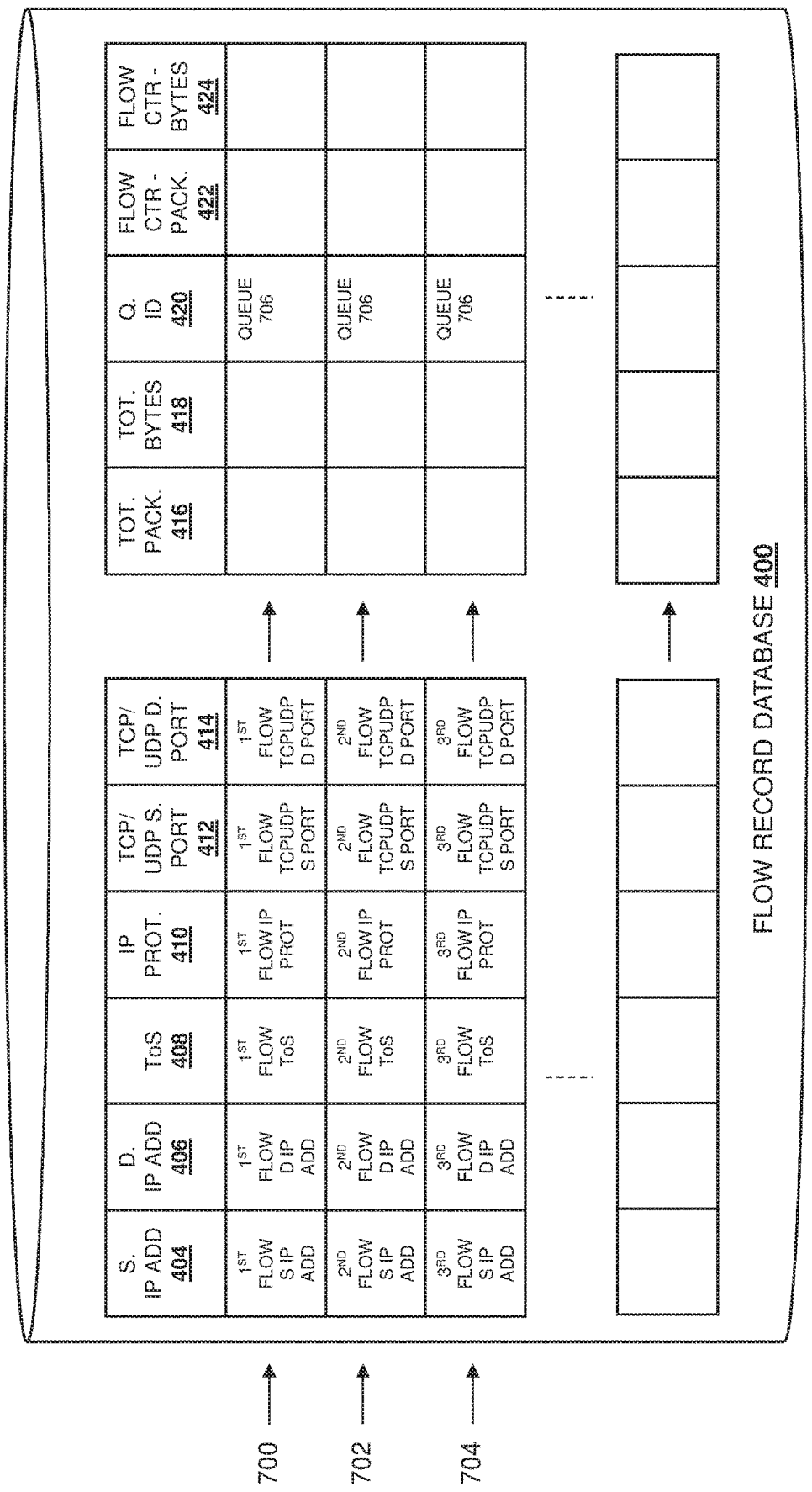
FIG. 7a is a schematic view illustrating an embodiment of the flow record database of FIG. 4 populated with flow identification information and queue flow identification information.

The method 500 proceeds to block 504 where the networking device provides, in the flow record for each flow, a queue identifier for the queue used to store data packets that are part of that flow. One of skill in the art in possession of the present disclosure will recognize that, for the first packet received at the switch device 300 for any particular flow, the flow engine 304 may create a flow record for that flow in the flow record database 400 (e.g., using the flow identification information in that data packet). As such, in an embodiment of block 504, the flow engine 304 in the switch device 300 may, for data packets received for each flow handled by the switch device, use the flow identification information in that data packet (e.g., the flow identification information in the data packet 600 of FIG. 6) to identify the data packet as part of a flow in a flow record in the flow record database 400, and identify the queue of the egress port that is used to store those data packets before forwarding them via that egress port in that flow record as well. For example, data packets for a first flow handled by the switch device 300 may ingress the switch device 300 via the ingress port 308b, and when the flow engine 304 processes those data packets for egress via the egress port 312a, it may identify those data packets as part of a flow in a flow record in the flow record database 400, and identify in that flow record which of the queues 314a those data packets will be stored in. For example, FIG. 7 illustrates a first flow record 700 for the first flow that identifies that first flow via a first flow source IP address as its source Internet Protocol IP address 404, a first flow destination IP address as its destination IP address 406, a first flow ToS as its Type of Service (ToS) 408, a first flow IP protocol as its IP protocol 410, a first flow TCP/DUP source port as its TCP/UDP source port 412, and a first flow TCP/UDP destination port as its TCP/UDP destination port 414. Furthermore, FIG. 7 illustrates how the first flow record 700 also identifies the one of the queues 314a for the egress port 312a (referred to below as "the queue 706") that is used to stored data packets that are part of the first flow before they egress the switch device 300 via the egress port 312a.

Similarly, data packets for a second flow handled by the switch device 300 may ingress the switch device 300 via the ingress port 308c, and when the flow engine 304 processes those data packets for egress via the egress port 312a, it may identify those data packets as part of a flow in a flow record in the flow record database 400, and identify in that flow record which of the queues 314a those data packets will be stored in. For example, FIG. 7 illustrates a second flow record 702 for the second flow that identifies that second flow via a second flow source IP address as its source Internet Protocol IP address 404, a second flow destination IP address as its destination IP address 406, a second flow ToS as its Type of Service (ToS) 408, a second flow IP protocol as its IP protocol 410, a second flow TCP/DUP source port as its TCP/UDP source port 412, and a second flow TCP/UDP destination port as its TCP/UDP destination port 414. Furthermore, FIG. 7 illustrates how the second flow record 702 also identifies the queue 706 (i.e., the same queue of the queues 314a for the egress port 312a being used to store data packets for the first flow) that is used to stored data packets that are part of the second flow before they egress the switch device 300 via the egress port 312a.

Similarly, data packets for a third flow handled by the switch device 300 may ingress the switch device 300 via the ingress port 308a, and when the flow engine 304 processes those data packets for egress via the egress port 312a, it may identify those data packets as part of a flow in a flow record in the flow record database 400, and identify in that flow record which of the queues 314a those data packets will be stored in. For example, FIG. 7 illustrates a third flow record 704 for the third flow that identifies that third flow via a third flow source IP address as its source Internet Protocol IP address 404, a third flow destination IP address as its destination IP address 406, a third flow ToS as its Type of Service (ToS) 408, a third flow IP protocol as its IP protocol 410, a third flow TCP/DUP source port as its TCP/UDP source port 412, and a third flow TCP/UDP destination port as its TCP/UDP destination port 414. Furthermore, FIG. 7 illustrates how the third flow record 704 also identifies the queue 706 (i.e., the same queue of the queues 314a for the egress port 312a being used to store data packets for the first flow and the second flow) that is used to stored data packets that are part of the third flow before they egress the switch device 300 via the egress port 312a. While the examples illustrated in FIG. 7 and provided herein only discusses three flow records in the flow record database 400 that identify three flows that all utilize the same queue 706 (i.e., one of the queues 314a), one of skill in the art in possession of the present disclosure will recognize that the flow record database may (and typically will) include many more flow records that identify many more flows that may utilize different queues.

The method 500 proceeds to block 506 where the networking device modifies, in the flow record for each flow for each data packet that is part of that flow and that is handled by the networking device, queue flow information in at least one data packet counter associated with the queue identifier. In an embodiment, at block 506, the flow engine 304 in the switch device 300 may, for data packets received for each flow handled by the switch device, modify the queue flow information in the queue data packet number counter 422 and the queue data packet byte counter 424 for that flow. For example, when the flow engine 304 stores data packets in the first flow in the queue 706 (i.e., one of the queues 314a) for egress via the egress port 312a, it may increment the queue data packet number counter 422 for each of those data packets, and increase the queue data packet byte counter 424 by the number of bytes in those data packets, while when those data packets in the first flow egress via the egress port 312a and exit the queue 706 (i.e., one of the queues 314a), it may decrement the queue data packet number counter 422 for each of those data packets, and decrease the queue data packet byte counter 424 by the number of bytes in those data packets.

Figure 7B:
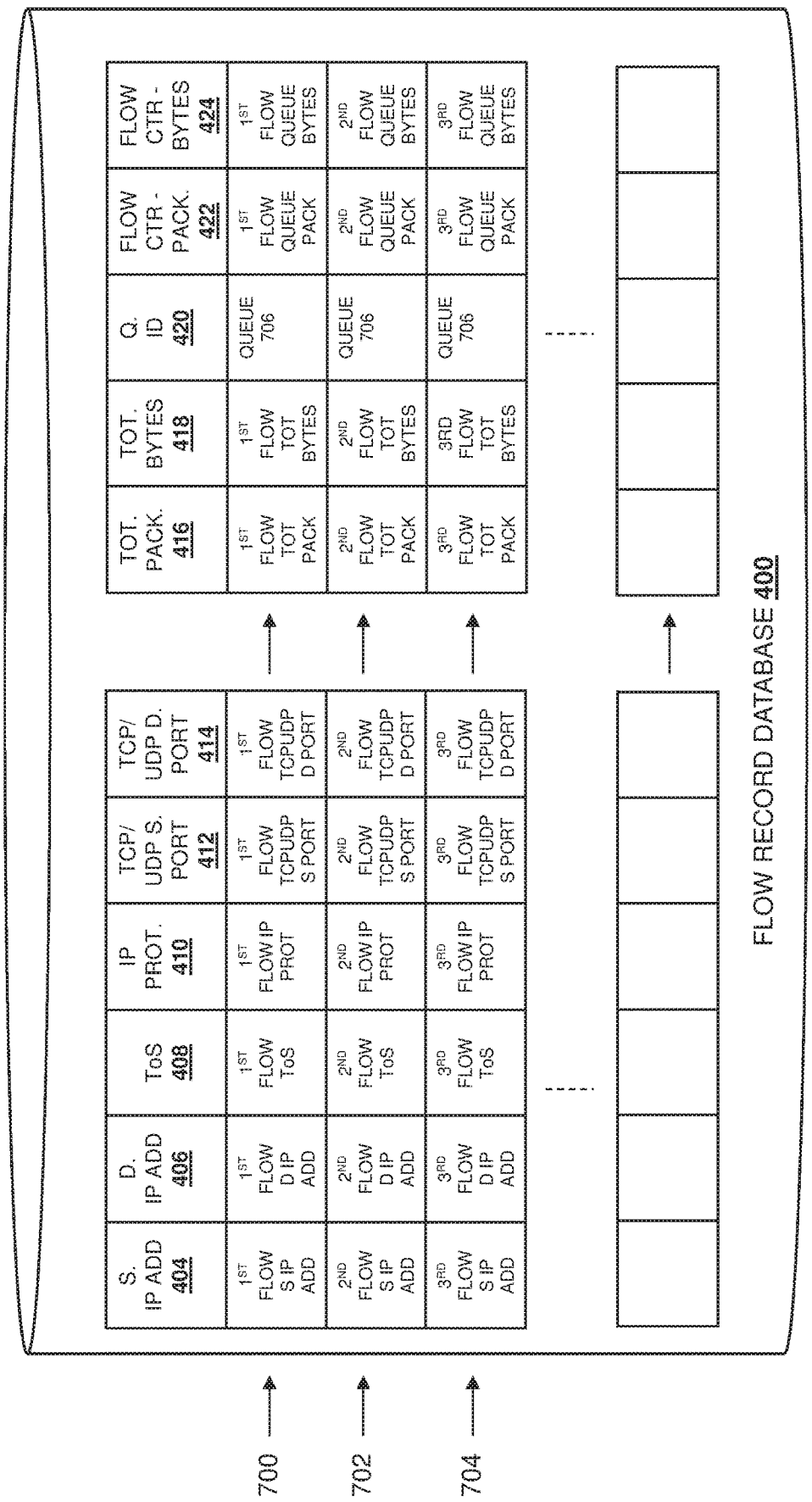
FIG. 7b is a schematic view illustrating an embodiment of the flow record database of FIG. 4 populated with flow tracking information and queue flow tracking information.

FIG. 7b illustrates the first flow record 700 for the first flow that identifies a number of data packets in the first flow currently in the queue 706 via the queue data packet number counter 422, which may be incremented as data packets in the first flow are stored in that queue 706, and decremented as data packets in the first flow exit that queue 706 and egress the egress port 312a. Furthermore, FIG. 7b also illustrates the first flow record 700 for the first flow that identifies a number of bytes of data packets in the first flow currently in the queue 706 via the queue data packet byte counter 424, which may be increased as data packets in the first flow are stored in that queue 706 (i.e., by the number of bytes in those data packets), and decreased as data packets in the first flow exit that queue 706 and egress the egress port 312a (i.e., by the number of bytes in those data packets). Further still, FIG. 7b also illustrates how the first flow record 700 also identifies a total number of data packets in the first flow that have been handled by the switch device 300 in the total packets handled column 416, and a total number of bytes of data packets in the first flow that have been handled by the switch device 300 in the total bytes handled column 418.

Similarly, when the flow engine 304 stores data packets in the second flow in the queue 706 (i.e., one of the queues 314a) for egress via the egress port 312a, it may increment the queue data packet number counter 422 for each of those data packets, and increase the queue data packet byte counter 424 by the number of bytes in those data packets, while when those data packets in the second flow egress via the egress port 312a and exit the queue 706 (i.e., one of the queues 314a), it may decrement the queue data packet number counter 422 for each of those data packets, and decrease the queue data packet byte counter 424 by the number of bytes in those data packets. FIG. 7b illustrates the second flow record 702 for the second flow that identifies a number of data packets in the second flow currently in the queue 706 via the queue data packet number counter 422, which may be incremented as data packets in the second flow are stored in that queue 706, and decremented as data packets in the second flow exit that queue 706 and egress the egress port 312a. Furthermore, FIG. 7b also illustrates the second flow record 702 for the second flow that identifies a number of bytes of data packets in the second flow currently in the queue 706 via the queue data packet byte counter 424, which may be increased as data packets in the second flow are stored in that queue 706 (i.e., by the number of bytes in those data packets), and decreased as data packets in the second flow exit that queue 706 and egress the egress port 312a (i.e., by the number of bytes in those data packets). Further still, FIG. 7b also illustrates how the second flow record 702 also identifies a total number of data packets in the second flow that have been handled by the switch device 300 in the total packets handled column 416, and a total number of bytes of data packets in the second flow that have been handled by the switch device 300 in the total bytes handled column 418.

Similarly, when the flow engine 304 stores data packets in the third flow in the queue 706 (i.e., one of the queues 314a) for egress via the egress port 312a, it may increment the queue data packet number counter 422 for each of those data packets, and increase the queue data packet byte counter 424 by the number of bytes in those data packets, while when those data packets in the third flow egress via the egress port 312a and exit the queue 706 (i.e., one of the queues 314a), it may decrement the queue data packet number counter 422 for each of those data packets, and decrease the queue data packet byte counter 424 by the number of bytes in those data packets. FIG. 7b illustrates the third flow record 704 for the third flow that identifies a number of data packets in the third flow currently in the queue 706 via the queue data packet number counter 422, which may be incremented as data packets in the third flow are stored in that queue 706, and decremented as data packets in the third flow exit that queue 706 and egress the egress port 312a. Furthermore, FIG. 7b also illustrates the third flow record 704 for the third flow that identifies a number of bytes of data packets in the third flow currently in the queue 706 via the queue data packet byte counter 424, which may be increased as data packets in the third flow are stored in that queue 706 (i.e., by the number of bytes in those data packets), and decreased as data packets in the third flow exit that queue 706 and egress the egress port 312a (i.e., by the number of bytes in those data packets). Further still, FIG. 7b also illustrates how the third flow record 704 also identifies a total number of data packets in the third flow that have been handled by the switch device 300 in the total packets handled column 416, and a total number of bytes of data packets in the third flow that have been handled by the switch device 300 in the total bytes handled column 418.

While the flow engine 304 has been described above as providing the queue flow information in the flow records for the flow record database 400, one of skill in the art in possession of the present disclosure will recognize that other methods and/or subsystems may be utilized to aggregate information about the queues 314a-c (e.g., for queues utilized in input/output queued switch devices, VoQ switch devices, etc.)

The method 500 then proceeds to decision block 508 where the networking device determines whether a microburst has been detected in a queue. In an embodiment, at decision block 508, the flow engine 304 in the switch device 300 may monitor each of the queues associated with its egress ports 312a-c to determine whether a microburst event has occurred. As would be understood by one of skill in the art in possession of the present disclosure, a microburst event associated with a queue may be characterized by a relatively short, relatively intense build up of data packets in that queue, and typically occurs in the duration of microseconds or milliseconds. However, microburst events associated with queues may include other characteristics while remaining within the scope of the present disclosure as well. At decision block 508, the flow engine 304 in the switch device 300 may monitor for microburst events in each queue by monitoring the rate of data packet build up in each queue, which may be accomplished by polling each queue for a queue depth at a relatively high frequency, or via the utilization of hardware that allows for the setting of a trigger based on queue data packet build up over time. While a few examples have been described, one of skill in the art in possession of the present disclosure will recognize that microburst events in queues may be detected using a variety of techniques that will fall within the scope of the present disclosure as well.

If, at decision block 508, the networking device determines that no microburst has been detected in a queue, the method 500 proceeds back to block 506 where the networking device modifies, in the flow record for each flow for each data packet that is part of that flow and that is handled by the networking device, queue flow information in at least one data packet counter associated with the queue identifier, in substantially the same manner as described above. As such, as long as no microburst events occur in any of the queues in the switch device 300, the flow engine 304 in the switch device 300 may modify the queue flow information (as well as the flow tracking information) for each flow in its corresponding flow record in the flow record database 400 substantially as described above.

If, at decision block 508, the networking device determines that a microburst has been detected in a queue, the method 500 proceeds back to block 510 where the networking device captures the queue flow information in each data packet counter associated with the queue identifier for the queue that experienced the microburst. In an embodiment, at block 510, the flow engine 304 in the switch device 300 may identify the queue that has experienced the microburst event, and capture any queue flow information for that queue in the flow record database 400. For example, in the event a microburst event is detected in the queue 706 (i.e., one of the queues 314a) discussed in the examples above, the flow engine 304 may use the queue identifier for the queue 706 to access the first flow record 700 in the flow record database 400 and capture the number of data packets in the first flow in the queue 706 at the time of the microburst event via the queue data packet number counter 422, and the number of bytes of data packets in the first flow in the queue 706 at the time of the microburst event via the queue data packet byte counter 424; as well as access the second flow record 702 in the flow record database 400 and capture the number of data packets in the second flow in the queue 706 at the time of the microburst event via the queue data packet number counter 422, and the number of bytes of data packets in the second flow in the queue 706 at the time of the microburst event via the queue data packet byte counter 424; as well as access the third flow record 704 in the flow record database 400 and capture the number of data packets in the third flow in the queue 706 at the time of the microburst event via the queue data packet number counter 422, and the number of bytes of data packets in the third flow in the queue 706 at the time of the microburst event via the queue data packet byte counter 424. While only three flows are used in this example, one of skill in the art in possession of the present disclosure will recognize that any number of flows utilizing the queue 706 may have similar queue flow information captured in substantially the same manner as discussed above.

In some embodiments, the capture of the queue flow information from any flow record may include the freezing of that queue flow information in the queue data packet number counter 422 and the queue data packet byte counter 424 for that flow record. As such, after a microburst event has been detected, the queue flow information in flow record for flows that utilize that queue may be frozen, thus storing that queue flow information for the queue that experienced that microburst event in the flow record database 400. As such, flow records in the flow record database may have their queue flow information frozen to capture the first microburst event occurring in their associated queue, the most recent microburst event occurring in their associated queue, the "worst" microburst event occurring in their associated queue, and/or a microburst event having any other characteristics that would be apparent to one of skill in the art in possession of the present disclosure. Thus, the queue data packet number counters 422 and queue data packet byte counters 424 may be initialized or reset, used to capture queue flow information about a microburst event occurring with their associated queues, and then subsequently reset following each microburst events to capture subsequent queue flow information, and so on.

In other embodiments, the capture of the queue flow information from any flow record may include the copying of that queue flow information in the queue data packet number counter 422 and the queue data packet byte counter 424 for that flow record, and the transmittal of that queue flow information to a microburst visibility database (not illustrated, but which may be included in the flow database(s) 306 or stored in another database internal or external to the switch device 300. However, while a few examples have been provided, queue flow information may be captured in a variety of manners that will fall within the scope of the present disclosure as well.

The method 500 then proceeds to block 512 where the networking device provides the queue flow information that was captured for analysis. In an embodiment, at block 512, the flow engine 304 in the switch device 300 may provide the queue flow information captured at block 510 for analysis by for example, displaying the queue flow information, transmitting the queue flow information via the network to a microburst analysis computing device, providing the queue flow information to a microburst analysis application included on the switch device 300, and/or in any other manner that would be apparent to one of skill in the art in possession of the present disclosure. While not described herein in detail, one of skill in the art will recognize how, with reference to the example provide above, the number of data packets in the first flow in the queue 706 at the time of the microburst event, the number of bytes of data packets in the first flow in the queue 706 at the time of the microburst event, the number of data packets in the second flow in the queue 706 at the time of the microburst event, the number of bytes of data packets in the second flow in the queue 706 at the time of the microburst event, the number of data packets in the third flow in the queue 706 at the time of the microburst event, and the number of bytes of data packets in the third flow in the queue 706 at the time of the microburst event may be utilized to determine which of the first, second, and/or third flow contributed to the microburst event, and which of the first, second, and/or third flow were affected by the microburst event.

Furthermore, one of skill in the art in possession of the present disclosure will recognize that other queue flow information may be tracked and captured in order to provide for further microburst event analysis while remaining within the scope of the present disclosure as well. While a single microburst event in a single queue has been described, one of skill in the art in possession of the present disclosure will recognize that the switch device 300 may track queue flow information for different queues (e.g., a first queue, a second queue, etc.), detect microburst events in each of those queues, and capture and provide that queue flow information for analysis in substantially the same manner as discussed above. Further still, while the above discussion focuses on microburst events in queues associated with egress ports, one of skill in the art in possession of the present disclosure will recognize that the above teachings may be applied to queues associated with ingress ports, and/or any other queues in a device, while remaining within the scope of the present disclosure as well.

A wide variety of modifications are envisioned to adapt the systems and methods discussed above for a variety of different situations. For example, some networking devices may experience issues in implementing the queue data packet number counter that is both incremented when data packets are stored in a queue and decremented when those data packets exit the queue, or the queue data packet byte counter that is increased by the number of bytes in data packets when those data packets are stored in a queue and decreased by the number of bytes in data packets when those data packets exit the queue, which may occur due to bandwidth issues, pipelining issues, and/or other issues that would be apparent to one of skill in the art in possession of the present disclosure. However, such issues may be addressed by, for example, identifying data packets in a flow by a single flow identifier, and providing data packet counters that are only incremented.

Figure 8:
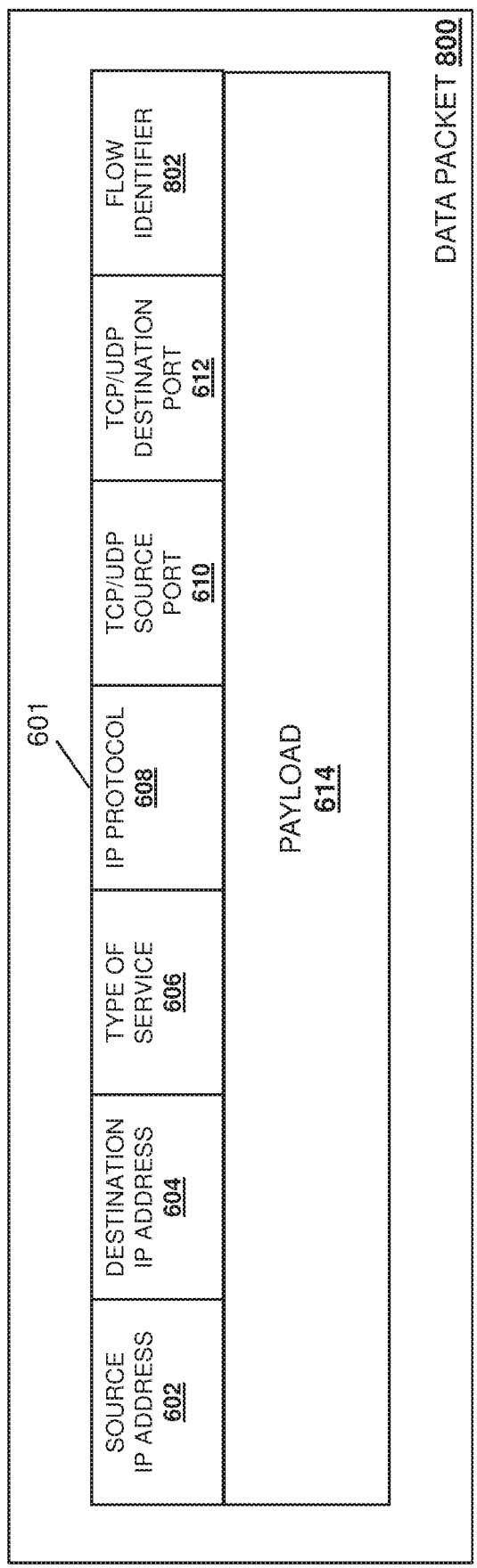
FIG. 8 is a schematic view illustrating an embodiment of a packet that may be transmitted as part of a flow from a sender device to a receiver device in the network of FIG. 2.

For example, FIG. 8 illustrates a data packet 800 that is similar to the data packet 600 discussed above with reference to FIG. 6, and thus include similar element numbers for similar features. However, the data packet 800 also includes a flow identifier 802 (e.g., in the packet header 601). For example, as discussed above, data packets (e.g., like the data packet 600) that enter the switch device via one of the ingress ports may be stored in a corresponding one of the queues, may be processed to identify the flow to which they belong (as discussed above), and then a flow identifier 802 for that flow may be added to the data packets. As will be appreciated by one of skill in the art in possession of the present disclosure, the flow identifier 802 in data packet 800 allows for the identification of the flow to which that data packet 800 belongs (e.g., via the checking of flow identifier 802 in the data packet) more efficiently than the identification of the flow to which the data packet 600 belongs via an n-tuple of flow identification information (e.g., due to the need to identify each of piece of flow identification information 602, 604, 606, 608, 610, and 612), as well as provides for more efficient subsequent lookups of the flow identification information in a table that includes the flow identification information as its key. This provides multiple advantages in cases where multiple tables must be looked up for a given flow. For example, the n-tuple extraction and lookup need only be performed once, and subsequent tables can be more compact, and implemented using direct lookup using the compact flow identifier rather than a complex lookup method such as a hash function operating on the n-tuple. Furthermore, one of skill in the art in possession of the present disclosure will recognize that the flow identifier added to a packet header of a packet being handled by a switch device may be removed from that packet header before that packet is transmitted out of the switch device (e.g., flow identifiers may be internal to switch devices, and packets exiting switch devices appear identical to how they entered those switch devices.)

Figure 9A:
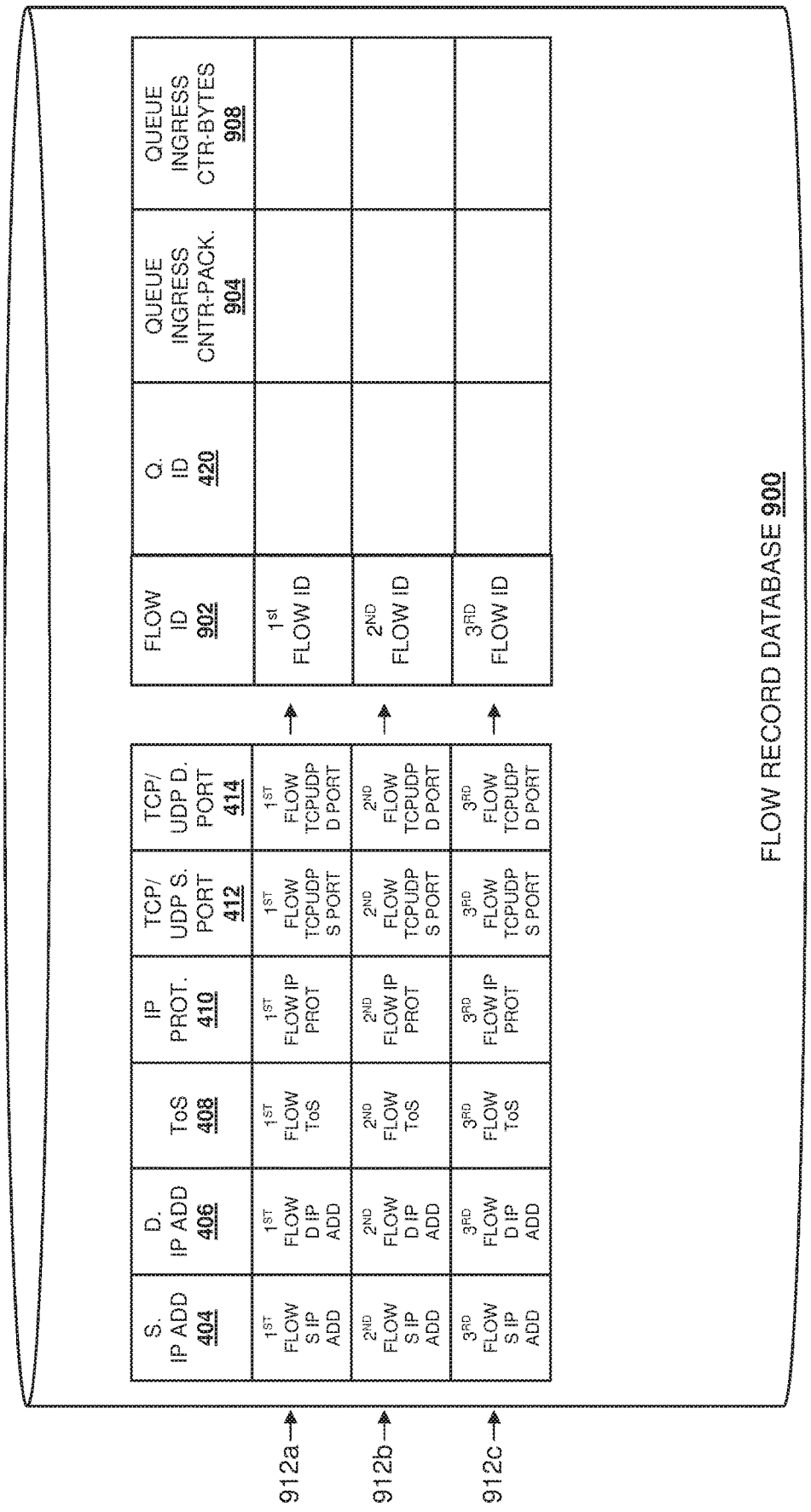
FIG. 9a is a schematic view illustrating an embodiment of the flow record database that may be included in the switch device of FIG. 3.

Referring now to FIG. 9a, an embodiment of a flow record database 900 is illustrated that may be utilized to address the issues discussed above. FIG. 9a provides an example of how flow identifiers may be associated with the flow identification information for any particular flow record. One of skill in the art in possession of the present disclosure will recognize that the flow record database 900 may associate the source IP address 404, the destination IP address 406, the ToS 408, the IP protocol 410, the TCP/UDP source port 412, and the TCP/UDP destination port 414 (as well as any other flow identification information provided in an n-tuple) with a respective flow identifier 902. As such, for a packet that is being en-queued (i.e., stored in a queue), the flow identifier information in that packet may be utilized to determine the associated flow identifier.

Figure 9B:
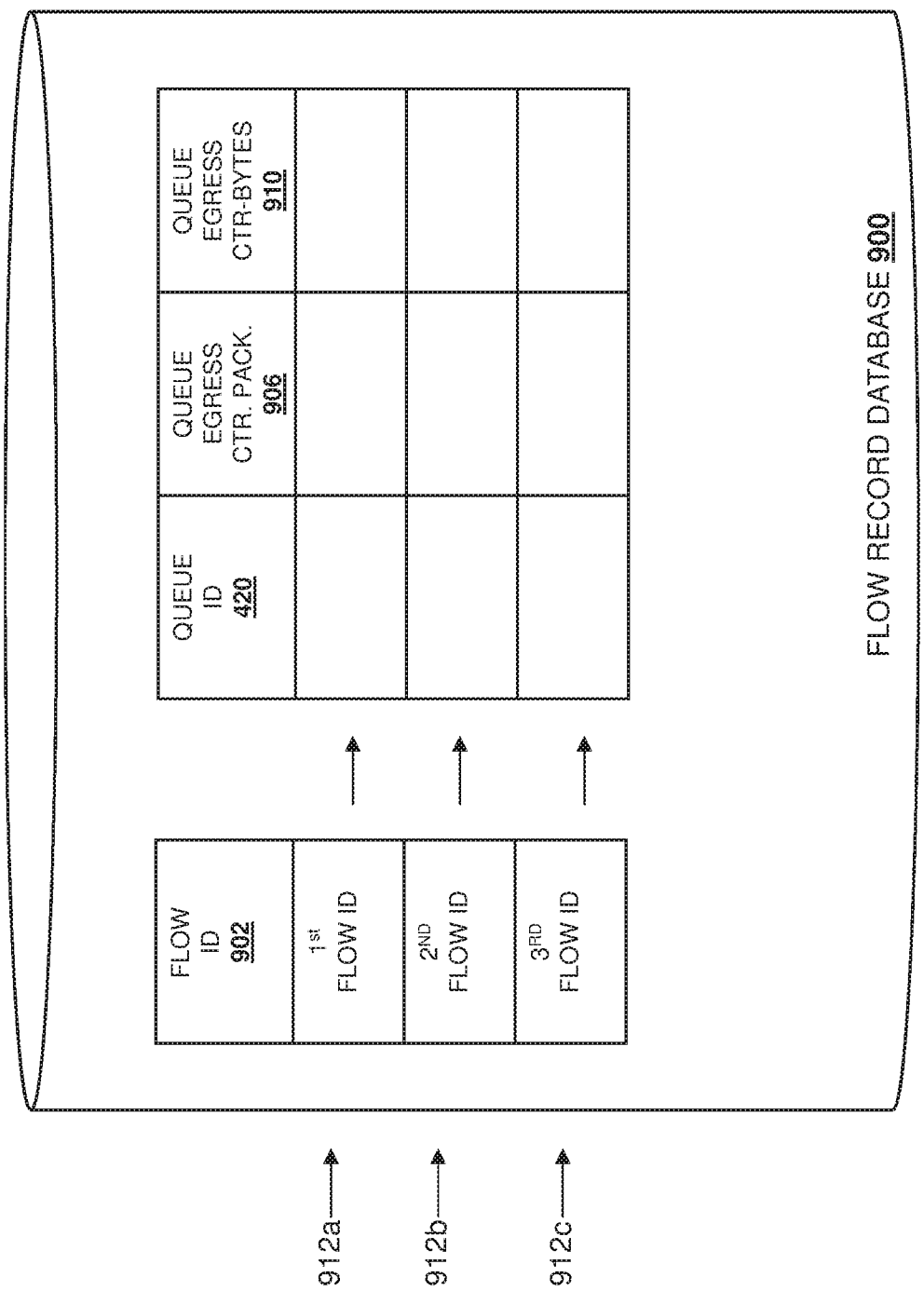
FIG. 9b is a schematic view illustrating an embodiment of the flow record database that may be included in the switch device of FIG. 3.

Furthermore, FIG. 9a illustrates how the flow identifiers for any particular packets in a flow may be associated with the queue identifier 420, a queue ingress packet number counter 904 (which may be substantially the same as the queue data packet number counter 422 discussed above), and a queue ingress packet byte counter 908 (which may be substantially the same as the queue data packet byte counter 424 discussed above), with those elements utilized substantially as discussed above. FIG. 9b illustrates how the flow identifiers for any particular packets in a flow may be associated with the queue identifier 420, a queue egress packet number counter 906, and a queue egress packet byte counter 910. As discussed above, data packets in different flows associated with flow records 912a, 912, and up to 912c, may have a flow identifier added to their packet headers upon ingress to the switch device 300, and that flow identifier may be identified in any data packet that is part of a flow, and provided as the flow identifier 902 in the flow record for that flow as well, which provides for quick identification of which flows data packets belong to when they enter a queue. In some examples, the flow identifiers discussed above may be utilized with the queue identifiers to extend the teachings of the present disclosure to queue(s) for the ingress ports 308a-c while remaining within the scope of the present disclosure.

Furthermore, at block 506 of the method 500, for each data packet in a flow entering a queue, the queue ingress packet number counter 904 for that flow may be incremented, and the queue ingress packet byte counter 908 may be increased by the number of bytes in that data packet. Further still, at block 506 of the method 500, for each data packet in a exiting a queue, the queue egress packet number counter 906 for that flow may be incremented, and the queue egress packet byte counter 910 may be increased by the number of bytes in that data packet. Upon the detection of a microburst event at block 508, the flow engine 304 in the switch device 300 may capture the queue flow information for the queue that experienced the microburst event by capturing a difference between the queue ingress packet number counter 904 and the queue egress packet number counter 906 for each flow that utilized that queue, and capturing the difference between the queue ingress packet byte counter 908 and the queue egress packet byte counter 910 for each flow that utilized that queue. In some embodiments, the queue ingress packet number counter 904, the queue egress packet number counter 606, the queue ingress packet byte counter 908, and the queue egress packet byte counter 910 for each flow may be reset when the number of data packets in a queue drops to zero. As illustrated in FIG. 9b, the flow identifier 902 may be utilized, upon de-queue (i.e., the removal of a packet from a queue), to quickly retrieve information from the queue egress packet number counter 606 and the queue egress packet byte counter 910. In some embodiments, the queue identifier may not be necessary as an output from subsequent tables because the data structures of subsequent tables may be organized by queue identifier, which would be available for the packet upon de-queue.

Figure 10:
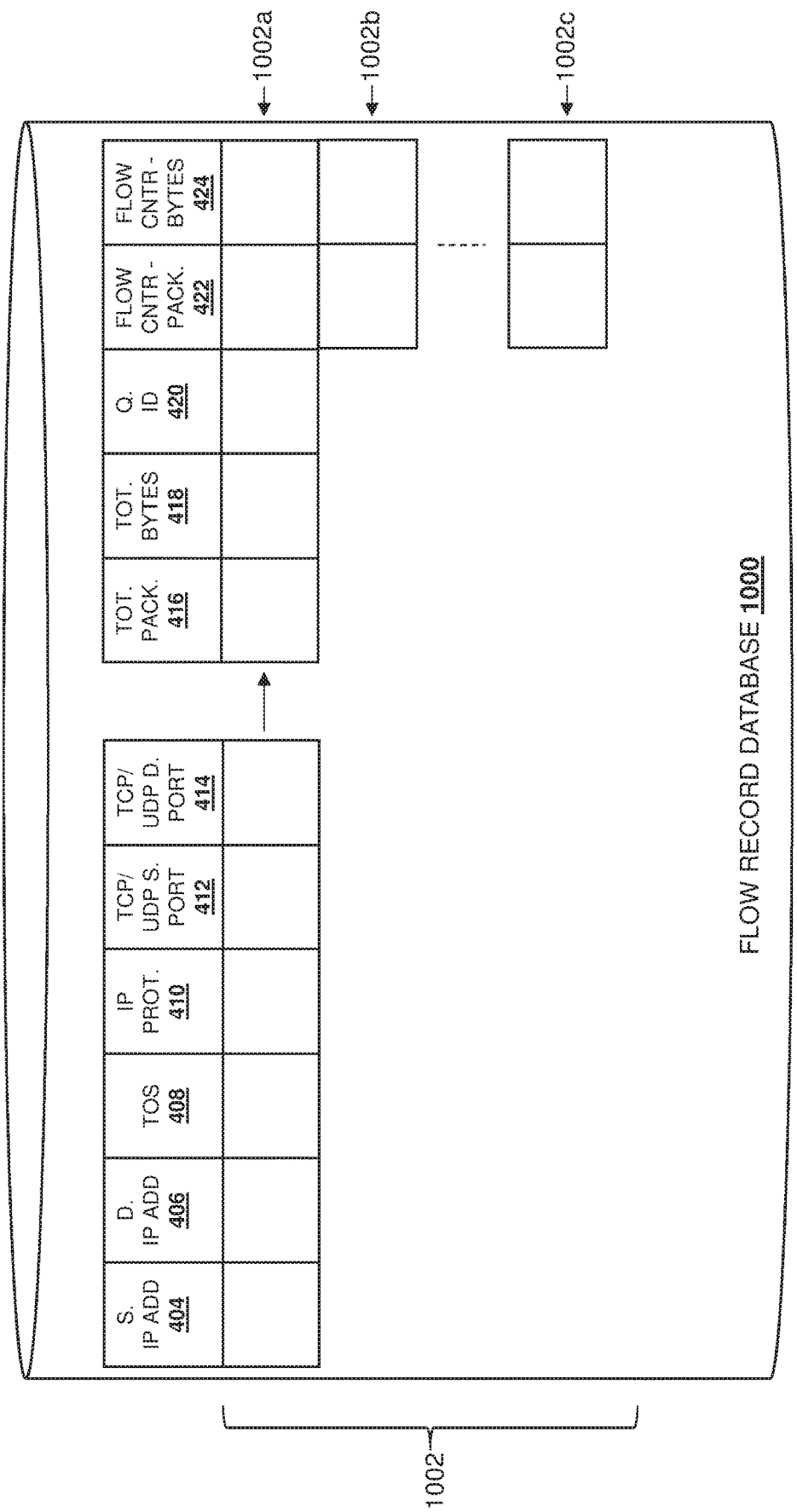
FIG. 10 is a schematic view illustrating an embodiment of the flow record database that may be included in the switch device of FIG. 3.

Another modification to the systems and methods discussed above may provide the ability to store queue flow information for multiple microburst events in a flow record associated with a single flow. With reference to FIG. 10, an embodiment of a flow record database 1000 is illustrated is similar to the flow record database 400 discussed above with reference to FIG. 4, and includes, for each flow record, the flow identification information (i.e., the source IP address 404, the destination IP address 406, the ToS 408, the IP protocol 410, the TCP/UDP source port 412, and the TCP/UDP destination port 414), the flow tracking information (e.g., the total packets handled column 416 and the total bytes handled column 418), and the queue flow information (e.g., the queue identifier 420, the queue data packet number counter 422, and the queue data packet byte counter 424.) However, for each flow record (e.g., the flow record 1002 illustrated in FIG. 10), queue flow information may be captured in multiple sets of the queue data packet number counter and the queue data packet byte counter (e.g., the sets 1002a, 1002b, and up to 1002c illustrated in FIG. 10.) As such, the first set 1002a of the queue data packet number counter and the queue data packet byte counter may track current queue flow information for a queue, while the sets 1002b and 1002c of the queue data packet number counter and the queue data packet byte counter may store the queue flow information that was captured in response to previous microburst events occurring in that queue. Thus, queue flow information for any particular flow may capture multiple microburst events occurring over time in its queue, and that queue flow information may be provided for analysis a microburst events occurring in a queue in substantially the same manner as discussed above.

Thus, systems and methods have been described that extend flow records to track the flows utilizing any particular queue, and capture the queue flow information in the event of a microburst event in a queue, which allows for the analysis of that queue flow information to determine the flow(s) that contributed to that microburst, the flows that were affected by that microburst, and/or other microburst visibility information that would be apparent to one of skill in the art in possession of the present disclosure. The systems and methods of the present disclosure include a networking device storing flow records that, in addition to storing flow identification information and flow tracking information for each flow handled by that networking device, also store queue flow information that provides for the identification of the queue used by data packets in each flow, as well as the number of data packets and data packet bytes in that queue for each flow at any particular time. Upon the detection of a microburst in a queue, the queue flow information may be captured and provided for analysis to determine which flows had data packets in that queue at the time of the microburst, the number data packets belonging to each flow that were in that queue at the time of the microburst, the number of data packet bytes belonging to each flow that were in that queue at the time of the microburst, and/or other information that provides visibility into the causes and effects of the microburst. Such flow records enhanced with queue flow tracking information provides visibility into queues during microburst events with relatively little processing (or other) overhead compared to conventional microburst visibility systems, and allows microburst visibility reports to be generated that can be viewed locally without the need for a microburst information collection system Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A microburst visibility system, comprising:
at least one sender device;
at least one receiver device; and
a switch device coupled to each of the at least one sender device and the at least one receiver device, wherein the switch device is configured to:
 receive a plurality of flows transmitted by the at least one sender device to the at least one receiver device and, for each of the plurality of flows that include data packets that are stored in a first queue:
  provide a first queue identifier for the first queue in a flow record associated with that flow; and
  modify, for each data packet that is transmitted as part of that flow, flow information in at least one data packet counter that is associated with the first queue identifier in the flow record associated with that flow;

detect a microburst associated with the first queue;

capture, using the first queue identifier for the first queue that is associated with the microburst, the flow information in each data packet counter that is associated with the first queue identifier in each of the flow records included in the switch device; and provide the flow information that was captured for analysis.

2. The system of claim 1, wherein the at least one data packet counter includes a data packet number counter and a data packet byte counter.

3. The system of claim 2, wherein the modifying the flow information in at least one data packet counter includes:

incrementing the data packet number counter each time a data packet enters the first queue, and decrementing the data packet number counter each time a data packet exits the first queue, and increasing the data packet byte counter with a number of bytes in a data packet each time that data packet enters the first queue, and decrementing the data packet byte counter with a number of bytes in a data packet each time that data packet exits the first queue.

4. The system of claim 1, wherein the at least one data packet counter includes a queue ingress packet number counter, a queue egress packet number counter, a queue ingress packet byte counter, and a queue egress packet byte counter.

5. The system of claim 4, wherein the modifying the flow information in at least one data packet counter includes:

incrementing the queue ingress packet number counter each time a data packet enters the first queue, and incrementing the queue egress packet number counter each time a data packet exits the first queue, and increasing the queue ingress packet byte counter with a number of bytes in a data packet each time that data packet enters the first queue, and increasing the queue egress packet byte counter with a number of bytes in a data packet each time that data packet exits the first queue.

6. The system of claim 5, wherein the capturing the flow information includes:

capturing a difference between the queue ingress packet number counter and the queue egress packet number counter; and capturing a difference between the queue ingress packet byte counter and the queue egress packet byte counter.

7. An Information Handling System (IHS), comprising:

a storage system including a flow database;

a processing system that is coupled to the storage system; and a memory system that is coupled to the processing system and that includes instructions that, when executed by the processing system, cause the processing system to provide a flow engine that is configured to:

receive a plurality of flows transmitted by at least one sender device to at least one receiver device and, for each of the plurality of flows that include data packets that are stored in a first queue:

provide a first queue identifier for the first queue in a flow record associated with that flow in the flow database; and modify, for each data packet that is transmitted as part of that flow, first queue flow information in at least one data packet counter that is associated with the first queue identifier in the flow record associated with that flow in the flow database;

detect a microburst associated with the first queue;

capture, using the first queue identifier for the first queue that is associated with the microburst, the first queue flow information in each data packet counter that is associated with the first queue identifier in each of the flow records included in the flow database; and provide the first queue flow information that was captured for analysis.

8. The IHS of claim 7, wherein the at least one data packet counter includes a data packet number counter and a data packet byte counter.

9. The IHS of claim 8, wherein the modifying the first queue flow information in at least one data packet counter includes:

incrementing the data packet number counter each time a data packet enters the first queue, and decrementing the data packet number counter each time a data packet exits the first queue, and increasing the data packet byte counter with a number of bytes in a data packet each time that data packet enters the first queue, and decrementing the data packet byte counter with a number of bytes in a data packet each time that data packet exits the first queue.

10. The IHS of claim 7, wherein the at least one data packet counter includes a queue ingress packet number counter, a queue egress packet number counter, a queue ingress packet byte counter, and a queue egress packet byte counter.

11. The IHS of claim 10, wherein the modifying the first queue flow information in at least one data packet counter includes:

incrementing the queue ingress packet number counter each time a data packet enters the first queue, and incrementing the queue egress packet number counter each time a data packet exits the first queue, and increasing the queue ingress packet byte counter with a number of bytes in a data packet each time that data packet enters the first queue, and increasing the queue egress packet byte counter with a number of bytes in a data packet each time that data packet exits the first queue.

12. The IHS of claim 11, wherein the capturing the first queue flow information includes:

capturing a difference between the queue ingress packet number counter and the queue egress packet number counter; and capturing a difference between the queue ingress packet byte counter and the queue egress packet byte counter.

13. The IHS of claim 7, wherein the flow engine is configured to:

receive the plurality of flows transmitted by the at least one sender device to the at least one receiver device and, for each of the plurality of flows that include data packets that are stored in a second queue:

provide a second queue identifier for the second queue in a flow record associated with that flow in the flow database; and modify, for each data packet that is transmitted as part of that flow, second queue flow information in at least one data packet counter that is associated with the second queue identifier in the flow record associated with that flow in the flow database;

detect a microburst associated with the second queue;

capture the second queue flow information in each data packet counter that is associated with the second queue identifier in each of the flow records included in the flow database; and provide the second queue flow information that was captured for analysis.

14. A method for providing microburst visibility, comprising:

receiving, by a networking device, a plurality of flows transmitted by at least one sender device to at least one receiver device and, for each of the plurality of flows that include data packets that are stored in a first queue:

providing a first queue identifier for the first queue in a flow record associated with that flow in the flow database; and modifying, for each data packet that is transmitted as part of that flow, first queue flow information in at least one data packet counter that is associated with the first queue identifier in the flow record associated with that flow in the flow database;

detecting, by the networking device, a microburst associated with the first queue;

capturing, by the networking device using the first queue identifier for the first queue that is associated with the microburst, the first queue flow information in each data packet counter that is associated with the first queue identifier in each of the flow records included in the flow database; and providing, by the networking device, the first queue flow information that was captured for analysis.

15. The method of claim 14, wherein the at least one data packet counter includes a data packet number counter and a data packet byte counter.

16. The method of claim 15, wherein the modifying the first queue flow information in at least one data packet counter includes:

incrementing the data packet number counter each time a data packet enters the first queue, and decrementing the data packet number counter each time a data packet exits the first queue, and increasing the data packet byte counter with a number of bytes in a data packet each time that data packet enters the first queue, and decrementing the data packet byte counter with a number of bytes in a data packet each time that data packet exits the first queue.

17. The method of claim 14, wherein the at least one data packet counter includes a queue ingress packet number counter, a queue egress packet number counter, a queue ingress packet byte counter, and a queue egress packet byte counter.

18. The method of claim 17, wherein the modifying the first queue flow information in at least one data packet counter includes:

incrementing the queue ingress packet number counter each time a data packet enters the first queue, and incrementing the queue egress packet number counter each time a data packet exits the first queue, and increasing the queue ingress packet byte counter with a number of bytes in a data packet each time that data packet enters the first queue, and increasing the queue egress packet byte counter with a number of bytes in a data packet each time that data packet exits the first queue.

19. The method of claim 18, wherein the capturing the first queue flow information includes:

capturing a difference between the queue ingress packet number counter and the queue egress packet number counter; and capturing a difference between the queue ingress packet byte counter and the queue egress packet byte counter.

20. The method of claim 14, further comprising:

receiving, by the networking device, the plurality of flows transmitted by the at least one sender device to the at least one receiver device and, for each of the plurality of flows that include data packets that are stored in a second queue:

providing a second queue identifier for the second queue in a flow record associated with that flow in the flow database; and modifying, for each data packet that is transmitted as part of that flow, second queue flow information in at least one data packet counter that is associated with the second queue identifier in the flow record associated with that flow in the flow database;

detecting, by the networking device, a microburst associated with the second queue;

capturing, by the networking device, the second queue flow information in each data packet counter that is associated with the second queue identifier in each of the flow records included in the flow database; and providing, by the networking device, the second queue flow information that was captured for analysis.

* * * * *